United States Patent
Cai et al.

(10) Patent No.: US 11,240,330 B2
(45) Date of Patent: Feb. 1, 2022

(54) METHOD AND SYSTEM FOR MANAGING APPLICATION PROGRAMS

(71) Applicant: BANMA ZHIXING NETWORK (HONGKONG) CO., LIMITED, Kowloon (HK)

(72) Inventors: Yanming Cai, Hangzhou (CN); Bo Qiang, Hangzhou (CN); Jinglu Han, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 223 days.

(21) Appl. No.: 16/144,788

(22) Filed: Sep. 27, 2018

(65) Prior Publication Data

US 2019/0132406 A1    May 2, 2019

Related U.S. Application Data

(63) Continuation-in-part of application No. PCT/CN2017/077917, filed on Mar. 23, 2017.

(30) Foreign Application Priority Data

Mar. 31, 2016 (CN) .......................... 201610202788.3

(51) Int. Cl.
*H04L 29/08* (2006.01)
*G06F 16/958* (2019.01)
*H04M 1/72454* (2021.01)
*G06F 16/955* (2019.01)
*G06F 16/2457* (2019.01)
*H04M 1/72406* (2021.01)

(52) U.S. Cl.
CPC ........ *H04L 67/26* (2013.01); *G06F 16/24578* (2019.01); *G06F 16/955* (2019.01); *G06F 16/958* (2019.01); *H04L 67/10* (2013.01); *H04L 67/16* (2013.01); *H04L 67/22* (2013.01); *H04M 1/72454* (2021.01); *H04M 1/72406* (2021.01)

(58) Field of Classification Search
CPC ......... H04L 67/26; H04L 67/10; H04L 67/16; H04L 67/22; H04M 1/72454; H04M 1/72406; H04M 1/72448; G06F 16/958; G06F 16/955; G06F 16/24578
See application file for complete search history.

(56) References Cited

U.S. PATENT DOCUMENTS 8,788,944 B1 * 7/2014 Gill .......................... G06F 8/61
                                                    715/744
10,109,023 B2   10/2018 Shah
2007/0207832 A1   9/2007 Gerardi
(Continued)

FOREIGN PATENT DOCUMENTS

CN   103530292   1/2014
CN   104539678   4/2015
CN   104954408   9/2015

*Primary Examiner* — Philip C Lee
(74) *Attorney, Agent, or Firm* — Van Pelt, Yi & James LLP

(57) ABSTRACT

Managing application programs is disclosed including perceiving a current context and determining that a first event has occurred, acquiring historical data relating to the first event, determining user behavior based on the historical data, and pushing application recommendation information or controlling application status based on the determination results.

25 Claims, 6 Drawing Sheets

(56) References Cited

U.S. PATENT DOCUMENTS

| | | | |
|---|---|---|---|
| 2011/0264663 A1* | 10/2011 | Verkasalo | G06Q 10/0637 |
| | | | 707/740 |
| 2012/0023226 A1* | 1/2012 | Petersen | H04L 65/608 |
| | | | 709/224 |
| 2013/0158981 A1 | 6/2013 | Ceylan | |
| 2013/0290359 A1* | 10/2013 | Eronen | G06F 16/00 |
| | | | 707/758 |
| 2014/0194146 A1* | 7/2014 | Yarvis | H04W 4/029 |
| | | | 455/456.3 |

\* cited by examiner

200

METHOD AND SYSTEM FOR MANAGING APPLICATION PROGRAMS

CROSS REFERENCE TO OTHER APPLICATIONS

This application is a continuation-in-part of and claims priority to International (PCT) Application No. PCT/CN2017/77917 entitled APPLICATION PROGRAM MANAGEMENT METHOD AND DEVICE filed Mar. 23, 2017 which is incorporated herein by reference in its entirety for all purposes, which claims priority to China Patent Application No. 201610202788.3 entitled AN APP MANAGEMENT METHOD AND DEVICE filed on Mar. 31, 2016 which is incorporated by reference in its entirety for all purposes.

FIELD OF THE INVENTION

The present application relates to a method and a system for managing application programs.

BACKGROUND OF THE INVENTION

As research and development into smart operating systems proceeds, behavior determination is becoming a function of smart operating systems and a reason for calling smart operating systems "smart."

For example, Android systems are capable of pushing weather, flight, and other information to users.

In another example, iOS systems are capable of pushing road condition information to users when the users get off work.

However, existing smart operating systems typically only push relevant service information based on user customization, even though such service information may not be what users actually need, and is deficient in terms of precision and scope of the information provided.

SUMMARY OF THE INVENTION

Embodiments of the present application disclose a process and a device for managing application programs.

A process for managing application programs, comprising:
perceiving a current context and determining that a first event has occurred;
acquiring historical data relating to the first event; and
determining user behavior based on the historical data and pushing application recommendation information or controlling application status based on the determination results.

A process for managing application programs, comprising:
determining that a first event has occurred based on a notification from a first smart device, the first event being determined after a first smart device perceives a current context;
acquiring historical data relating to the first event, wherein the historical data is obtained after collecting uploaded data; and
determining user behavior based on the historical data and causing a first device to push application recommendation information or control application status based on the determination results.

A device for managing application programs, comprising:
a determining unit configured to perceive a current context and determine that a first event has occurred;
an acquiring unit configured to acquire historical data relating to the first event;
a processing unit configured to determine user behavior based on the historical data, and push application recommendation information or control application status based on the determination results.

A server for managing application programs, comprising:
a determining unit configured to determine that a first event has occurred based on a notification from a first smart device, the first event being determined after the first smart device perceives a current context;
an acquiring unit configured to acquire historical data relating to the first event, wherein the historical data is obtained after collecting data uploaded by the first smart device;
a processing unit configured to determine user behavior based on the historical data and instruct the first smart device to push application recommendation information or to control application status based on the determination results.

The benefits of the present invention include at least the following:

by collecting data uploaded using at least one smart device, historical data that accurately records user use habits can be obtained. In the event that a first smart device perceives that a first event has occurred, the first smart device or server can determine user behavior based on the historical data and based on the determination results, push application recommendation information or control application status through the first smart device. Thus, after the first event occurs, user behavior according to user use habits based on shared historical data can be accurately determined, and accurate application management can be determined based on the user behavior. As a result, application management can be more precise and reasonable, operating time can be reduced, and user experience can be enhanced.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

To manage application programs more precisely and reasonably, an embodiment of the present application predicts of a user's next action based on the user's use habits given the occurrence of a first event in the user's current context and provides related application programs as a service.

Figure 1:
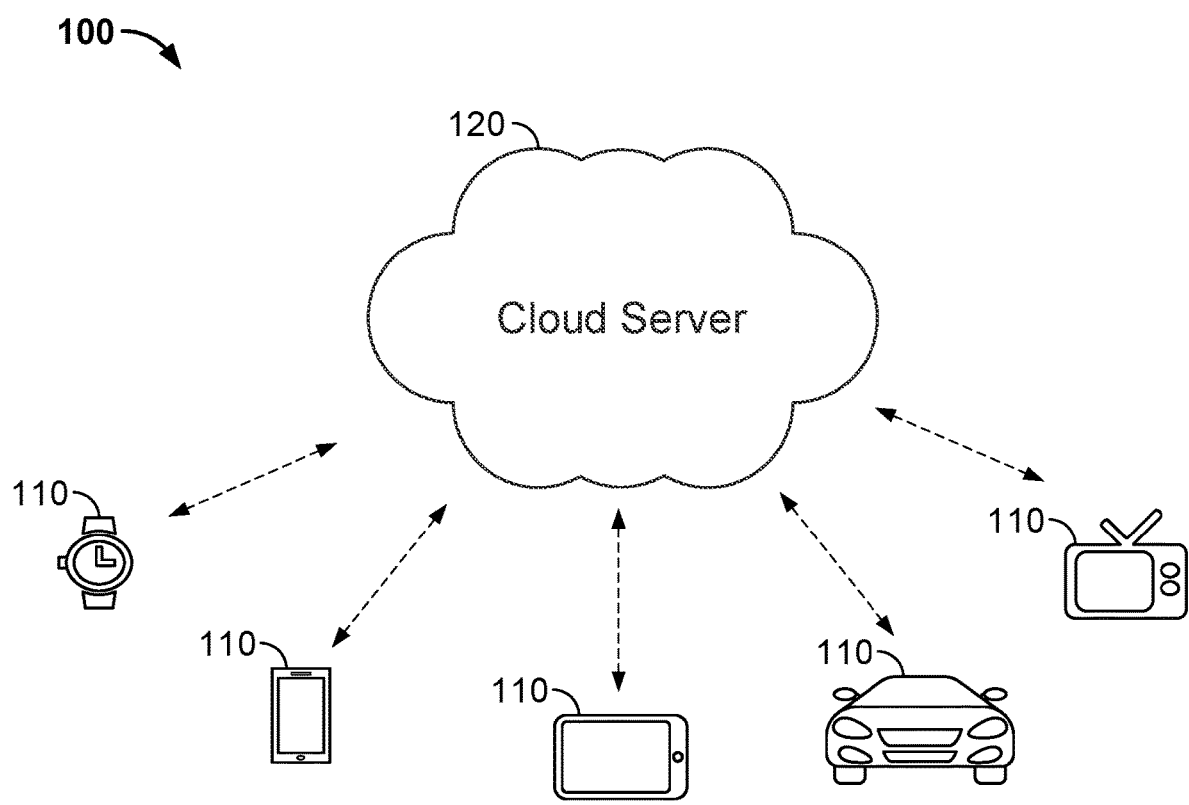
FIG. 1 is a diagram of an embodiment of a system for managing application programs.

FIG. 1 is a diagram of an embodiment of a system for managing application programs. In some embodiments, the system 100 includes multiple smart devices 110 used by one user or multiple smart devices 110 used by different users. The multiple smart devices 110 can log on to a server 120 or a cloud server 120 and implement data sharing. The smart devices 110 can be wearable devices (such as smart watches, smart bracelets, etc.), smart phones, tablet computers, smart vehicle-mounted systems, smart furniture (such as, smart televisions), etc. In some embodiments, a unified smart operating system can be installed on these smart devices 110. In this way, each of the smart devices 110 can upload data that the each smart device has monitored in a specific use environment to the server 120 for collection, thus increasing the precision and scope of the accumulated historical data. Subsequent users can perform habit analysis and behavior determination also to be more precise.

For example, after a smart operating system is installed on different smart devices 110 used by the same user, or after a smart operating system is installed on different smart devices used by different users, each smart device separately records the following personal information provided by the corresponding user: age, sex, etc. In addition, each smart device records information relating to the user's use habits while using the application. Examples of use habits include: getting up at 7:00 AM, driving to work at 8:00 AM, watching television at 9:00 PM, etc. The recorded information corresponds to the user's use habits and includes the following information: current device-related information, application identification information, start time when application was opened, cumulative duration of application use, geographic location at time of application use, whether application was opened using another application, and what application if it was so opened.

In addition, all information recorded by all users is synchronized on the server 120, and the server 120 classifies user groups based on the personal information of each user. For example, female users in the age range of 30-40 years old are classified as one group, male users in the age range of 30-40 years old are classified as another group, etc. After a smart device used by a user in a user group logs on to the server 120, the relevant user information generated by the smart device 110 is to be automatically synchronized with other smart devices used by other users in the same group and also synchronized with different smart devices used by the same user.

Figure 2:
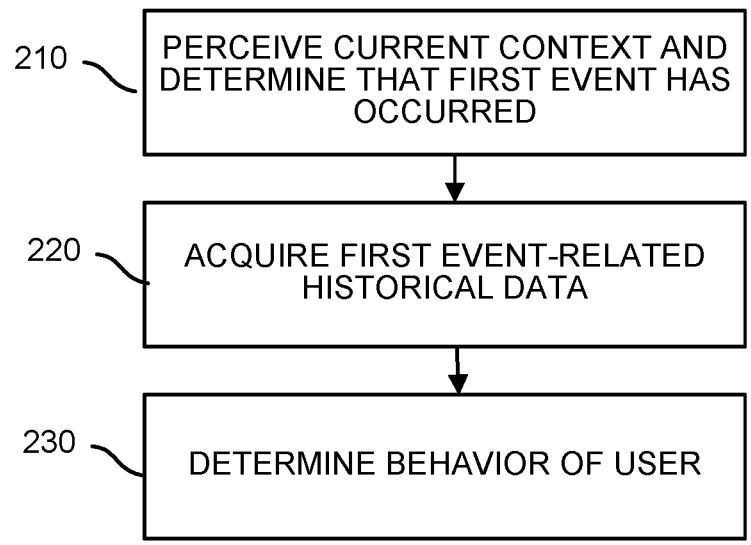
FIG. 2 is a flowchart of an embodiment of a process for managing application programs.

FIG. 2 is a flowchart of an embodiment of a process for managing application programs. In some embodiments, the process 200 is implemented by a smart device 110 of FIG. 1 and comprises:

In 210, the first smart device perceives a current context and determines that a first event has occurred. In some embodiments, the current context relates to time and location. In some embodiments, the first event is determined based on the current context.

The prediction analysis of process 200 is to be triggered in four contexts below:

As an aspect, the first smart device can determine that a first event has occurred in at least the four contexts below:

1) In the event that the first smart device perceives that a user has engaged in an application use behavior, the first smart device determines that a first event has occurred.

For example, the first smart device opens a browser.

2) In the event that the first smart device perceives a change in geographic location, the first smart device determines that a first event has occurred.

For example, the first smart device determines that the user has moved from point A to point B, where point A and point B are at least 100 feet apart.

3) In the event that the first smart device perceives that a specific event has been triggered, the first smart device determines that a first event has occurred.

For example, the first smart device determines that a "calendar alert event" has occurred.

In another example, the first smart device determines that the "alarm clock" function set by the user went off.

4) In the event that the first smart device perceives that a repeating event is to occur within a set amount of time, the first smart device determines that a first event has occurred.

For example, the first smart device determines that the "alarm clock" function set by the user is to go off within 10 minutes.

In 220, the first smart device acquires first event-related historical data.

In some embodiments, in the event that the first smart device acquires first event-related historical data, the first smart device can employ the two techniques below:

In a first technique, the first smart device locally selects first event-related historical data.

The selected historical data records a set of operating actions for the user using the first smart device at the time of first event occurrence. Examples of operating actions include: launch an application, switch to another application, etc. In other words, the first smart device can analyze local historical data to determine user behavior conforming to personal habits.

In a second technique, the first smart device sends descriptive information concerning a first event to a server to cause the server to select first event-related historical data from saved data, and receives the selected historical data sent back by the server. Examples of descriptive information include: device information, account information, etc. The data saved by the server was obtained after collecting the data uploaded by various smart devices. Moreover, the selected historical data records the set of operating actions by various users at the time of first event occurrence.

Moreover, in the second technique, the first smart device sends descriptive information concerning a first event to the server in the event that the first smart device has determined that the number of first event historical instances involving the smart device has reached a set threshold. This is because when the number of first event historical instances involving the smart device has reached a set threshold, the server can collect sufficient historical data and then the first smart device can determine the user's next action based on the historical data.

In 230, the first smart device determines the behavior of the user based on the obtained historical data and pushes application recommendation information or controls application status based on the determined behavior. In some embodiments, the application recommendation information or the application status is in a table form including application name and user usage statistic data. For example, the table includes in one column, the application name: application 1, application 2, etc. and in another column, the corresponding recommendation information: 40%, 30%, etc.

The second technique is employed in the event that the first technique cannot be employed and the smart device can obtain the historical data. Then, in the second technique, the smart device determines, based on the historical data, the set of operating actions previously performed by the user at the time of first event occurrence, ranks each operating action recorded in the set of operating actions in order of relevance to the first event starting with the highest relevance and ending with the lowest relevance, and selects the first N operating actions as the determination results. In some embodiments, N is a preset value. By adopting the second technique, the first smart device can select the higher-relevance operating actions that follow the occurrence of the first event (e.g., the operating actions that are executed most often following the occurrence of the first event) and either push recommendation information or control status relating to the applications corresponding to the operating actions. Of course, many ways to calculate relevance exist, and are well understood. Accordingly, the calculation of relevance is not to be further discussed for conciseness.

In some embodiments, the first smart device can employ at least two techniques for pushing application recommendation information or controlling application status based on determination results:

In the first technique, the first smart device selects at least one related application based on the determination results and pushes recommendation information about the at least one application or controls the status of the at least one application.

In the second technique, the first smart device selects at least one related operating action based on the determination results, selects an application matching current device status parameters of the first smart device from the at least one operating action, and pushes recommendation information about the selected application or controls the status of the selected application.

The device status parameters include at least one of the following: device type, already run applications, CPU usage, memory usage, etc.

As an example of an application (referred to as application X below):

In the above first and second techniques, in the event that the first smart device pushes recommendation information about application X, the first smart device can push descriptive information about application X (e.g., send a download address of the application, web pages corresponding to the application, etc.), or the first smart device can push service information about application X (send service content specifically provided by the application, such as weather forecast information or movie ticket recommendation information).

In the first and second techniques, in the event that the first smart device controls application X status, the first smart device can download the corresponding application X, or the first smart device can preload the corresponding application X.

A few examples of application scenarios are provided below to provide a more detailed explanation.

First Scenario:

The first smart device perceives that the user is using "instant messaging software." The first smart device determines, based on local historical data, that in the event that the user uses the "instant messaging software," the user typically also uses "payment software." Thus, the first smart device preloads the "payment software."

Thus, in the event that the user is to use payment software in the course of using the instant messaging software, the user is to be able to call or start "payment software" immediately to complete a payment without having to wait a long time. The preloading of the "payment software" increases the operating efficiency of the calling of the "payment software."

Second Scenario:

The first smart device perceives that a user's geographic position has moved to within the vicinity of a "movie theater." The first smart device determines, based on historical data collected from various smart devices, that a majority of users are to purchase movie tickets in the event that they are in the vicinity of the "movie theater." Thus, the first smart device pushes "movie ticket purchasing information" to the user or pushes "movie ticket purchasing software" download address to the user.

Thus, in the event that the user wants to watch a movie, the user can directly purchase a movie ticket that they want to watch based on the movie ticket-related information recommended by the first smart device and thus reducing operating time to watch the movie.

Third Scenario:

After the first smart device determines that a locally-set alert event "meeting" has been triggered, the first smart device determines, based on local historical data, that the applications which the user typically opens next are the "itinerary arranging software" and the "notebook software." Thus, the first smart device preloads the "itinerary arranging software" and the "notebook software."

Thus, while preparing for the meeting, the user can at any time call the "itinerary arranging software" and the "notebook software" to prepare for the substance of the meeting.

Fourth Scenario:

After the first smart device determines that an "alarm clock" function, which is set to repeat daily, has gone off, the first smart device determines, based on historical data collected from various smart devices, that the applications that the user generally opens next are "weather forecasting software" and "traffic information software." As an aspect, the first smart device is currently running a "video" function, and, given the first smart device's device status parameters, the first smart device determines that the first smart device's central processing unit (CPU) performance is not high. Therefore, the first smart device may crash if both "weather forecasting software" and "traffic information software"

applications are pre-loaded, and the first smart device can thus select only one application for preloading so that the system of the first smart device does not crash.

As an example, in the event that the first smart device determines that the relevance of the "traffic information software" to the "alarm clock" function is 60%, that the relevance of the "weather forecasting software" to the "alarm clock" function is 40%, and that the current idle ratio of the system CPU is 30%, the system of the first smart device is to only preload the "traffic information software" while omitting to preload the "weather forecasting software." In some embodiments, the relevance is determined based on user habit and/or usage statistical data. Of course, the first smart device can push recommendation information about the "weather forecasting software" to the user. Thus, in the event that the user wishes to browse weather forecasts, the user can use a browsing address included in the recommendation information to directly log on to the web page and view the weather forecast in the location without preloading the "weather forecasting software" locally.

Thus, the first smart device can preload applications that the first smart device can handle according to the first smart device's current performance without putting a severe load on itself.

As an aspect, in the event that a user is to use certain applications, the above technique make it possible to download the applications directly within the shortest possible time based on recommendation information or open the latest preloaded information without having to wait. As a result, users save time.

The selection of which particular application is to be preloaded depends on the particular environment and user preferences.

Figure 3:
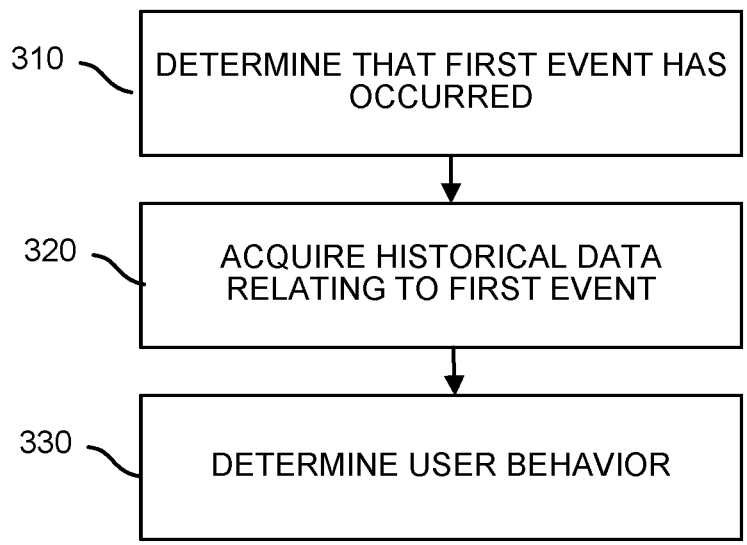
FIG. 3 is a flowchart of another embodiment of a process for managing application programs.

FIG. 3 is a flowchart of another embodiment of a process for managing application programs. In some embodiments, the process 300 is implemented by a server 120 of FIG. 1 and comprises:

In 310, the server determines that a first event has occurred based on a notification from a first smart device. The first event can be determined after the first smart device perceives a current context.

In the situation, after the first smart device perceives the current context and determine that the first event has occurred, the first smart device can notify the server. The subsequent decision-making is to be performed by the server.

In 320, the server acquires historical data relating to the first event. In some embodiments, the historical data is obtained after collecting data uploaded by the first smart device.

As an example, the server acquires first event-related historical data based on data reported by the first smart device, or acquires first event-related historical data after collecting data reported by various smart devices.

Similarly, the server can select first event-related historical data upon determining historical occurrences of the first event have reached a set threshold. In some embodiments, the selected historical data records a set of user operating actions at the time of first event occurrence.

In 330, the server determines user behavior based on the obtained historical data and instructs the first smart device to push application recommendation information or control application status based on the determination results.

As an example, when performing operation 330, the server first determines, based on the obtained historical data, a set of operating actions previously executed by the user at the time of first event occurrence. Subsequently, the server ranks each operating action recorded in the set of operating actions set in order of their number of executions from greatest number of executions to least number of executions, and selects the first N operating actions as the determination results. In some embodiments, N is a preset value.

In the event that the server instructs the first smart device to push application recommendation information or control application status, the server can adopt at least the following two techniques:

In a third technique, the server selects at least one related application based on the determination results and instructs the first smart device to push recommendation information about the at least one application or control the status of the at least one application.

In a fourth technique, the server selects at least one related application based on the determination results, selects an application matching current device status parameters of the first smart device from the at least one application, and instructs the first smart device to push recommendation information about the selected application or controls a status of the selected application. The device status parameters include one or more of the following: device type, already run applications, CPU usage, memory usage, etc.

To use the example of an application (referred to as application X below):

In the third and fourth techniques, in the event that the first smart device pushes recommendation information about application X, the server can push descriptive information about application X (e.g., send the download address of the application, web pages corresponding to the application, etc.), or the server can push service information about application X (e.g., send service content provided by the application, such as weather forecast information or movie ticket recommendation information).

In the third and fourth techniques, in the event that the first smart device controls application X status, the system can download the corresponding application X, or the system can preload the corresponding application X.

A few application scenarios are provided to explain the above embodiment.

Fifth Scenario:

The server learns, according to a first smart device notification, that the user is using "meal ordering software." The server then determines, based on local historical data collected from smart devices belonging to the user of the first smart device, that in the event that this user uses "meal ordering software," the user typically is to also start "news software." The server then instructs the first smart device to preload the "news software."

Thus, should the user wish to browse the news while eating a meal, the first smart device can immediately open the "news software" for the user. This effectively increases operating efficiency.

Sixth Scenario:

The server learns, according to a first smart device's location service notification, that the user's geographic location has moved to within the vicinity of "the mall." The server determines, based on local historical data collected from all the smart devices of different users, that the majority of users use coupons when in the vicinity of "the mall." Then the server pushes "coupon information" to the user or pushes a download address for "coupon download software" to the user.

Thus, in the event that a user wishes to purchase merchandise, the user can directly use the "coupon information" pushed by the first smart device and thereby save time.

Seventh Scenario:

The first smart device detects through motion sensing and monitoring that the user is currently driving a car and informs the server that the user is currently driving a car. The server acquires local historical data collected from all the smart devices belonging to the user of the first smart device and determines that the user, in the event that the user is driving vehicle A, typically logs on to a smart vehicle-mounted system and uses the "navigation" and "music playing" functions of the smart vehicle-mounted system. Thus, assuming that the server has learned that user A is now driving vehicle B and that the first smart device is a smart watch having a relatively low processing performance and cannot simultaneously start both the "navigation" function and "music playing" function, the server instructs the smart device to start the "navigation" function only and omits also starting the "music playing" function.

In actual practice, some historical data about the user can be collected only by specific smart devices. For example, driving data can be collected only by a vehicle-mounted device, while body temperature, heartbeat, and other such data can be collected by a smart wearable device. Therefore, the above techniques make possible the sharing of collected data across different smart devices and thus make possible accurate analysis to obtain user habits. This analysis in turn leads to improved behavior determination and application recommendation or application control.

Eighth Scenario:

The server determines, based on a first smart device notification, that the alert event "weekend," which was set by the user, has been triggered. The server determines, based on local historical data collected from all the smart devices used by different users, that the majority of users are to play games and watch videos during the weekend. Then the server instructs the first smart device to recommend the latest "game software" to the user and update "video software" to include the latest content.

Thus, in the event that the user wishes to play a game or watch a video during the weekend, the first smart device can immediately recommend the most recently updated "game software" and present the user with the latest video content, which is to have already been completely cached or downloaded. As a result, operating time is reduced.

Ninth Scenario:

The server determines, based on a first smart device notification, that "end of work hours," which was set by the user as a repeating event, has already been triggered. In the event that the first smart device is a smart vehicle-mounted system, the server determines, based on collected first smart device historical data, that the user is to start the car's air-conditioning at this time. The server then instructs the first smart device to turn on the air-conditioning inside the car and adjust the temperature to a suitable temperature before the user gets off work.

Thus, in the event that the user enters the car, the car's interior temperature is to have already been adjusted to an appropriate temperature. The user need not wait a long time for the car's interior temperature to be adjusted. This automatic adjustment effectively enhances the user's experience.

Tenth Scenario:

The server learns, according to a first smart device notification, that an email received by the first smart device involves a route keyword preset by the user (i.e., conforms to a preset operating action). The server thus can determine, based on local historical data collected from all the smart devices used by different users, that the majority of users are to use "navigation software" at this time. The server then instructs the first smart device to preload the "navigation software."

Thus, the first smart device can reduce operating time by completing route navigation in the shortest possible time.

In the event that a user truly is to use certain applications, the above techniques can download the applications directly within the shortest possible time based on recommendation information or open the latest preloaded information without having to wait. As a result, users experience major reductions in operating time.

The selection of which particular application is to be preloaded depends on the particular environment and user preferences, and will not be further discussed for conciseness.

Figure 4:
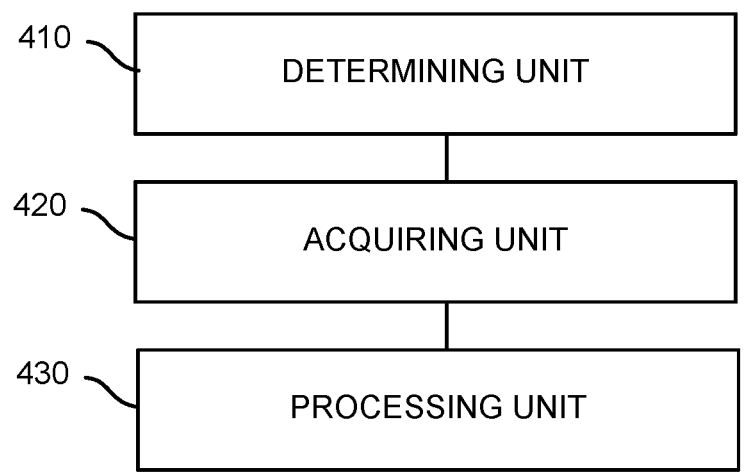
FIG. 4 is a functional structure diagram of an embodiment of a device for managing application programs.

FIG. 4 is a functional structure diagram of an embodiment of a device for managing application programs. In some embodiments, the device 400 is configured to perform process 200 and includes a determining unit 410, an acquiring unit 420, and a processing unit 430.

In some embodiments, the determining unit 410 is configured to perceive a current context and determine that a first event has occurred.

In some embodiments, the acquiring unit 420 is configured to acquire historical data relating to the first event.

In some embodiments, the processing unit 430 is configured to determine user behavior based on the historical data, and push application recommendation information or control application status based on the determination results.

In some embodiments, in the event that the perceiving of the current context and the determining that the first event has occurred, the determining unit 410 is further configured to:

determine that the first event has occurred upon perceiving the user's current operating action and perceiving that the user has engaged in application use behavior; or determine that the first event has occurred upon perceiving the user's current geographic location and perceiving that the geographic location has changed; or determine that the first event has occurred upon perceiving a user-configured specific event and perceiving that the specific event has been triggered; or determine that the first event has occurred upon perceiving a user-configured repeating event and perceiving that the repeating event is to occur within a set amount of time.

In some embodiments, in the event that the acquiring of the historical data relating to the first event, the acquiring unit 420 is configured to:

locally select first event-related historical data; or send descriptive information concerning the first event to a server, cause the server to select the first event-related historical data from stored data, and receive the selected historical data sent back by the server. In some embodiments, the data stored by the server was obtained after collecting the data uploaded by various smart devices.

In some embodiments, the selected historical data records a set of user operating actions at the time of first event occurrence.

In some embodiments, in the event that the determining of the user behavior based on the historical data has occurred, the processing unit 430 is further configured to:

determine a set of operating actions previously executed by the user at the time of first event occurrence based on the historical data; and rank each operating action recorded in the set of operating actions in order of its relevance to the first event starting with operating action having the highest relevance and ending with operating action having the lowest relevance, and select the first N operating actions as the determination results. In some embodiments, N is a preset value.

In some embodiments, in the event that the pushing of the application recommendation information or the controlling of the application status based on the determination results, the processing unit 430 is further configured to:

select at least one related application based on the determination results and push recommendation information about the at least one application or control the status of the at least one application; or select at least one related application based on the determination results, select an application matching current device status parameters of the first smart device from the at least one application, and push recommendation information about the selected application or control the status of the selected application.

In some embodiments, the device status parameters include one or more of the following: device type, already run applications, CPU usage, memory usage, etc.

In some embodiments, in the event that the selecting of the at least one related application based on the determination results has occurred, the processing unit 430 is further configured to:

upon perceiving that the user has engaged in application use behavior, determine, based on the historical data, at least one application used in relation to the occurrence of the application use behavior.

In some embodiments, in the event that the selecting of the at least one related application based on the determination results has occurred, the processing unit 430 is further configured to:

upon perceiving a change in geographic location, determine, based on the historical data, at least one application used in relation to the change in geographic location.

In some embodiments, in the event that the selecting of the at least one related application based on the determination results has occurred, the processing unit 430 is further configured to:

upon perceiving that the user-configured specific event was triggered, determine, based on the historical data, at least one application used in relation to the triggering of the specific event.

In some embodiments, in the event that selecting at least one related application based on the determination results has occurred, the processing unit 430 is further configured to:

upon perceiving that a user-configured repeating event was triggered, determine, based on the historical data, at least one application used in relation to the triggering of the repeating event.

In some embodiments, in the event that pushing recommendation information about the application has occurred, the processing unit 430 is further configured to:

push descriptive information about the application; or
push service information about the application.

In some embodiments, in the event that controlling the status of the application has occurred, the processing unit 430 is further configured to:

download the application; or
preload the application.

Figure 5:
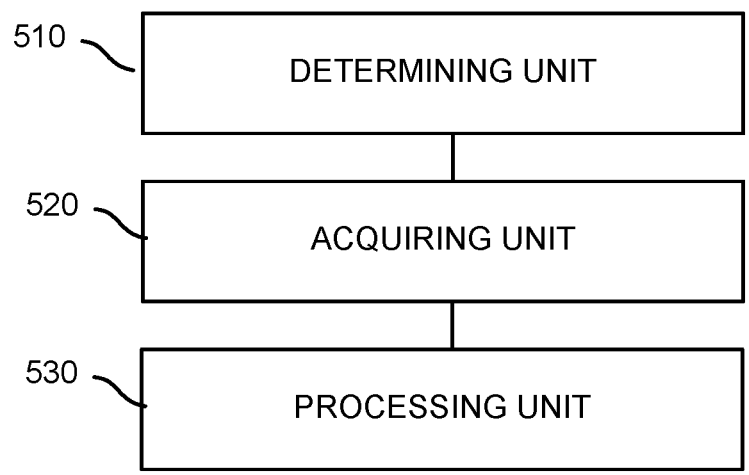
FIG. 5 is a functional structure diagram of another embodiment of a device for managing application programs.

FIG. 5 is a functional structure diagram of another embodiment of a device for managing application programs. In some embodiments, the device 500 is configured to perform process 300 and includes a determining unit 510, an acquiring unit 520, and a processing unit 530.

In some embodiments, the determining unit 510 is configured to determine that a first event has occurred based on a notification from a first smart device, the first event being determined after the first smart device perceives a current context.

In some embodiments, the acquiring unit 520 is configured to acquire historical data relating to the first event. In some embodiments, the historical data is obtained after collecting data uploaded by the first smart device.

In some embodiments, the processing unit 530 is configured to determine user behavior based on the historical data and instruct the first smart device to push application recommendation information or control application status based on the determination results.

In some embodiments, in the event that the acquiring of the historical data related to the first event has occurred, the acquiring unit 520 is further configured to:

select, based on first event descriptive information sent by the first smart device, the historical data relating to the first event from stored historical data. In some embodiments, the stored historical data is obtained after collecting data uploaded by the first smart device or various smart devices, and the selected historical data records a set of user operating actions at the time of first event occurrence.

In some embodiments, in the event that the determining of the user behavior based on the historical data has occurred, the processing unit 530 is further configured to:

determine a set of operating actions previously executed by the user at the time of the first event occurrence based on the historical data;

rank each operating action recorded in the set of operating actions in order of its relevance to the first event starting with the highest relevance and ending with the lowest relevance, and select the first N operating actions as the determination results. In some embodiments, N is a preset value.

In some embodiments, in the event that instructing the first smart device to push application recommendation information or control application status based on the determination results has occurred, the processing unit 530 is further configured to:

select at least one related application based on the determination results and instruct the first smart device to push recommendation information about the at least one application or to control the status of the at least one application; or select at least one related application based on the determination results, select an application matching current device status parameters of the first smart device from the at least one application, and instruct the first smart device to push recommendation information about the selected application or control the status of the selected application.

In some embodiments, the device status parameters include one or more of the following: device type, already run applications, CPU usage, memory usage, etc.

In some embodiments, in the event that the selecting of the at least one related application based on the determination results, the processing unit 530 is further configured to:

upon learning that the first smart device has perceived that a user has engaged in an application use behavior, determine, based on the historical data, the at least one application used in relation to the occurrence of the application use behavior.

In some embodiments, in the event that the selecting of the at least one related application based on the determination results has occurred, the processing unit 530 is further configured to:

upon learning that the first smart device has perceived a change in geographic location, determine, based on the historical data, the at least one application used in relation to the change in geographic location.

In some embodiments, in the event that selecting at least one related application based on the determination results has occurred, the processing unit 530 is further configured to:

upon learning that the first smart device has perceived that a user-configured specific event was triggered, determine, based on the historical data, the at least one application used in relation to the triggering of the specific event.

In some embodiments, in the event that the selecting of the at least one related application based on the determination results has occurred, the processing unit 530 is further configured to:

upon learning that the first smart device has perceived that a user-configured repeating event was triggered, instruct the system to determine, based on the historical data, at least one application used in relation to the triggering of the repeating event.

In some embodiments, in the event that the instructing of the first smart device to push recommendation information about the application has occurred, the processing unit 530 is further configured to:

instruct the first smart device to push descriptive information about the application; or instruct the first smart device to push service information about the application.

In some embodiments, in the event that the instructing of the first smart device to control the status of the application, the processing unit 530 is further configured to:

instruct the first smart device to download the application; or instruct the first smart device to preload the application.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

Figure 6:
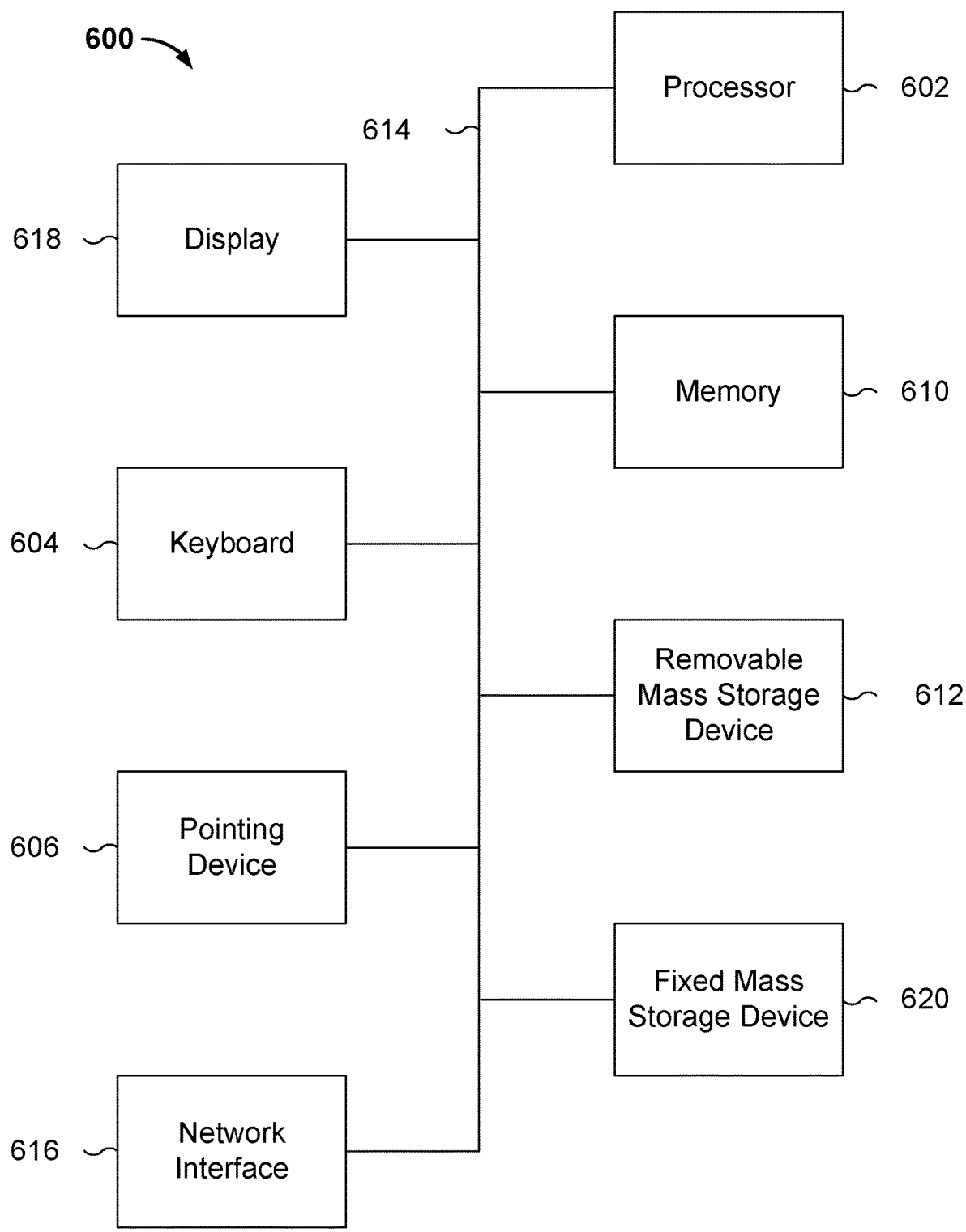
FIG. 6 is a functional diagram illustrating a programmed computer system for managing application programs in accordance with some embodiments.

FIG. 6 is a functional diagram illustrating a programmed computer system for managing application programs in accordance with some embodiments. As will be apparent, other computer system architectures and configurations can be used to manage application programs. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storages 612, 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
perceiving a current context and determining that a first event has occurred;
acquiring historical data relating to the first event;
determining user behavior based on the historical data; and
pushing application recommendation information or controlling application status based on the determination results, wherein the application recommendation information relates to a first plurality of applications, wherein the application status relates to a second plurality of applications, and wherein the pushing of the application recommendation information or the controlling of the application status comprises:
determining relevances of applications of the first plurality of applications or relevances of applications of the second plurality of applications, wherein the relevances of the applications of the first plurality of applications or the relevances of the applications of the second plurality of applications is determined based on user habit, usage statistical data, or both;
ranking the relevances of the applications of the first plurality of applications or the relevances of the applications of the second plurality of applications;
determining whether a system central processing unit (CPU) is capable of executing the first plurality of applications or the second plurality of applications without crashing; and
in response to a determination that the system CPU is not capable of executing the first plurality of applications or the second plurality of applications without crashing, omitting to push at least one application of the first plurality of applications associated with the application recommendation information or control at least one application of the second plurality of applications associated with the application status, wherein the at least one application of the first plurality of applications or the at least one application of the second plurality of applications is determined based on the ranked relevances of the applications of the first plurality of applications or the ranked relevances of the applications of the second plurality of applications.

2. The method as described in claim 1, wherein the perceiving of the current context and the determining that the first event has occurred comprises:
performing one of the following:
determining that the first event has occurred in the event that it is perceived that, based at least in part on the current operating action, the user has engaged in an application use behavior;
determining that the first event has occurred in the event that it is perceived that, based at least in part on a current geographical location of the user, that the geographic location has changed;
determining that the first event has occurred in the event that it is perceived that, based at least in part on a user-configured specific event, that the specific event has been triggered; and/or
determining that the first event has occurred in the event that it is perceived, based at least in part on a user-configured repeating event, that a repeating event is to occur within a set amount of time.

3. The method as described in claim 1, wherein the acquiring of the historical data relating to the first event comprises:
A) locally selecting first event-related historical data; or
B) sending descriptive information relating to the first event to a server to cause the server to select the first event-related historical data from stored data; and
receiving the selected historical data sent back from the server, wherein the data stored by the server was obtained after collecting the data uploaded by various smart devices, and wherein the selected historical data records a set of user operations at a time of first event occurrence.

4. The method as described in claim 1, wherein the determining of the user behavior based on the historical data comprises:
determining a set of operating actions previously executed by the user at a time of first event occurrence based on the historical data;
ranking operating actions recorded in the set of operating actions in order of their relevance to the first event starting with a highest relevance and ending with a lowest relevance; and
selecting the first N operating actions as the determination results, wherein N is a preset value.

5. The method as described in claim 1, wherein the pushing of the application recommendation information or the controlling of the application status based on the determination results comprises:
A) selecting at least one related application based on the determination results; and
performing one of the following:
pushing recommendation information about the at least one related application; or
controlling a status of the at least one related application; or
B) selecting at least one related application based on the determination results;
selecting an application matching current device status parameters from the at least one related application; and
pushing recommendation information about the selected application or controlling a status of the selected application.

6. The method as described in claim 5, wherein the device status parameters include one or more of the following:

device type, already run applications, central processing unit (CPU) usage, or memory usage.

7. The method as described in claim 5, wherein the selecting of the at least one related application based on the determination results comprises:
upon perceiving that the user has engaged in application use behavior, determining, based on the historical data, at least one application used in relation to an occurrence of the application use behavior.

8. The method as described in claim 5, wherein the selecting of the at least one related application based on the determination results comprises:
upon perceiving a change in geographic location, determining, based on the historical data, at least one application used in relation to the change in geographic location.

9. The method as described in claim 5, wherein the selecting of the at least one related application based on the determination results comprises:
upon perceiving that a user-configured specific event was triggered, determining, based on the historical data, at least one application used in relation to the triggering of the specific event.

10. The method as described in claim 5, wherein the selecting of the at least one related application based on the determination results comprises:
upon perceiving that a user-configured repeating event was triggered, determining, based on the historical data, at least one application used in relation to the triggering of the repeating event.

11. The method as described in claim 5, wherein the pushing of the recommendation information about the at least one related application comprises:
pushing descriptive information about the at least one related application; or
pushing service information about the at least one related application.

12. The method as described in claim 5, wherein the controlling of the status of the at least one related application comprises:
downloading the at least one related application; or
preloading the at least one related application.

13. A method, comprising:
determining that a first event has occurred based on a notification from a first smart device, the first event being determined after the first smart device perceives a current context;
acquiring historical data relating to the first event, wherein the historical data is obtained based at least in part on data uploaded by the first smart device;
determining user behavior based on the historical data; and
instructing the first smart device to push application recommendation information or control application status based on the determined user behavior, wherein the application recommendation information relates to a first plurality of applications, wherein the application status relates to a second plurality of applications, and wherein the instructing of the first smart device comprises:
determining relevances of applications of the first plurality of applications or relevances of applications of the second plurality of applications, wherein the relevances of the applications of the first plurality of applications or the relevances of the applications of the second plurality of applications is determined based on user habit, usage statistical data, or both;
ranking the relevances of the applications of the first plurality of applications or the relevances of the applications of the second plurality of applications;
determining whether a first device central processing unit (CPU) is capable of executing the first plurality of applications or the second plurality of applications without crashing; and
in response to a determination that the first device CPU is not capable of executing the first plurality of applications or the second plurality of applications without crashing, omitting to instruct the first smart device to push at least one application of the first plurality of applications associated with the application recommendation information or control at least one application of the second plurality of applications associated with the application status, wherein the at least one application of the first plurality of applications or the at least one application of the second plurality of applications is determined based on the ranked relevances of the applications of the first plurality of applications or the ranked relevances of the applications of the second plurality of applications.

14. The method as described in claim 13, wherein the acquiring of the historical data relating to the first event comprises:
selecting, based on first event descriptive information sent by the first smart device, historical data relating to the first event from stored data, wherein the stored data is obtained after collecting data uploaded by the first smart device or various smart devices, and wherein the selected historical data records a set of user operating actions at the time of first event occurrence.

15. The method as described in claim 13, wherein the determining of the user behavior based on the historical data comprises:
determining a set of operating actions previously executed by a user at the time of first event occurrence based on the historical data;
ranking operating actions recorded in the set of operating actions in order of relevance to the first event starting with a highest relevance and ending with a lowest relevance; and
selecting the first N operating actions as determination results, wherein N is a preset value.

16. The method as described in claim 13, wherein the instructing of the first smart device to push application recommendation information or control application status based on the determination results comprises:
A) selecting at least one related application based on the determination results; and
instructing the first smart device to push recommendation information about the at least one application or control a status of the at least one application; or
B) selecting at least one related application based on the determination results;
selecting an application matching current device status parameters of the first smart device from the at least one application; and
instructing the first smart device to push recommendation information about the selected application or control a status of the selected application.

17. The method as described in claim 16, wherein the device status parameters include one or more of the following: device type, already run applications, central processing unit (CPU) usage, and/or memory usage.

18. The method as described in claim 16, wherein the selecting of the at least one related application based on the determination results comprises:
  learning that the first smart device has perceived that the user has engaged in application use behavior; and
    determining, based on the historical data, at least one application used in relation to the application use behavior.

19. The method as described in claim 16, wherein the selecting of the at least one related application based on the determination results comprises:
  learning that the first smart device has perceived a change in geographic location; and
    determining, based on the historical data, at least one application used in relation to the change in geographic location.

20. The method as described in claim 16, wherein the selecting of the at least one related application based on the determination results comprises:
  learning that the first smart device has perceived that a user-configured specific event was triggered, and
    determining, based on the historical data, at least one application used in relation to the triggering of the specific event.

21. The method as described in claim 16, wherein the selecting of the at least one related application based on the determination results comprises:
  learning that the first smart device has perceived that a user-configured repeating event was triggered; and
    determining, based on the historical data, at least one app used in relation to the triggering of the repeating event.

22. The method as described in claim 15, wherein the instructing of the first smart device to push application recommendation information comprises:
  instructing the first smart device to push descriptive information about the application; or
    instructing the first smart device to push service information about the application.

23. The method as described in claim 15, wherein the instructing the first smart device to control the application status comprises:
  instructing the first smart device to download the application; or
    instructing the first smart device to preload the application.

24. A system, comprising:
a processor; and
  a memory coupled with the processor, wherein the memory is configured to provide the processor with instructions which when executed cause the processor to:
    perceive a current context and determining that a first event has occurred;
    acquire historical data relating to the first event;
    determine user behavior based on the historical data; and
    push application recommendation information or controlling application status based on the determination results, wherein the application recommendation information relates to a first plurality of applications, wherein the application status relates to a second plurality of applications, and wherein the pushing of the application recommendation information or the controlling of the application status comprises to:
      determine relevances of applications of the first plurality of applications or relevances of applications of the second plurality of applications, wherein the relevances of the applications of the first plurality of applications or the relevances of the applications of the second plurality of applications is determined based on user habit, usage statistical data, or both;
      rank the relevances of the applications of the first plurality of applications or the relevances of the applications of the second plurality of applications;
      determine whether a system central processing unit (CPU) is capable of executing the first plurality of applications or the second plurality of applications without crashing; and
      in response to a determination that the system CPU is not capable of executing the first plurality of applications or the second plurality of applications without crashing, omit pushing at least one application of the first plurality of applications associated with the application recommendation information or controlling at least one application of the second plurality of applications associated with the application status, wherein the at least one application of the first plurality of applications or the at least one application of the second plurality of applications is determined based on the ranked relevances of the applications of the first plurality of applications or the ranked relevances of the applications of the second plurality of applications.

25. A computer program product being embodied in a tangible non-transitory computer readable storage medium and comprising computer instructions for:
  perceiving a current context and determining that a first event has occurred;
  acquiring historical data relating to the first event;
  determining user behavior based on the historical data; and
  pushing application recommendation information or controlling application status based on the determination results, wherein the application recommendation information relates to a first plurality of applications, wherein the application status relates to a second plurality of applications, and wherein the pushing of the application recommendation information or the controlling of the application status comprises:
    determining relevances of applications of the first plurality of applications or relevances of applications of the second plurality of applications, wherein the relevances of the applications of the first plurality of applications or the relevances of the applications of the second plurality of applications is determined based on user habit, usage statistical data, or both;
    ranking the relevances of the applications of the first plurality of applications or the relevances of the applications of the second plurality of applications;
    determining whether a system central processing unit (CPU) is capable of executing the first plurality of applications or the second plurality of applications without crashing; and in response to a determination that the system CPU is not capable of executing the first plurality of applications or the second plurality of applications without crashing, omitting to push at least one application of the first plurality of applications associated with the application recommendation information or control at least one application of the second plurality of applications associated with the application status, wherein the at least one application of the first plurality of applications or the at least one application of the second plurality of applications is determined based on the ranked relevances of the applications of the first plurality of applications or the ranked relevances of the applications of the second plurality of applications.

\* \* \* \* \*